May 21, 1946.                J. M. PERKINS                2,400,839
                              BORING BAR
                          Filed Nov. 27, 1943

Inventor
J. M. Perkins

Patented May 21, 1946

2,400,839

UNITED STATES PATENT OFFICE 2,400,839

BORING BAR

John Mervyn Perkins, Rugby, England, assignor of one-half to George H. Alexander Machinery Limited, Birmingham, England Application November 27, 1943, Serial No. 511,999
In Great Britain December 22, 1942

1 Claim. (Cl. 77—58)

This invention relates to boring bars, and has for its object to provide improved means for steadying and holding a boring bar centrally during its operation on a metal or other work piece.

In the accompanying sheet of explanatory drawings—

Figure 2:
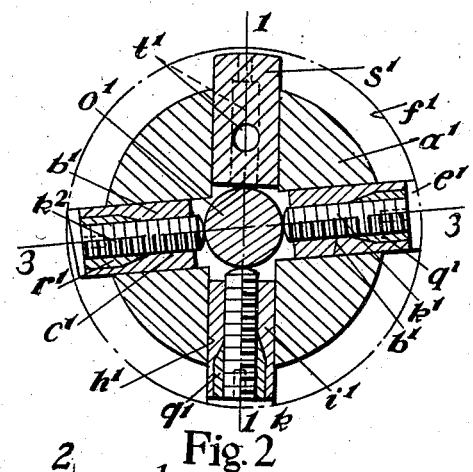
Figure 1:
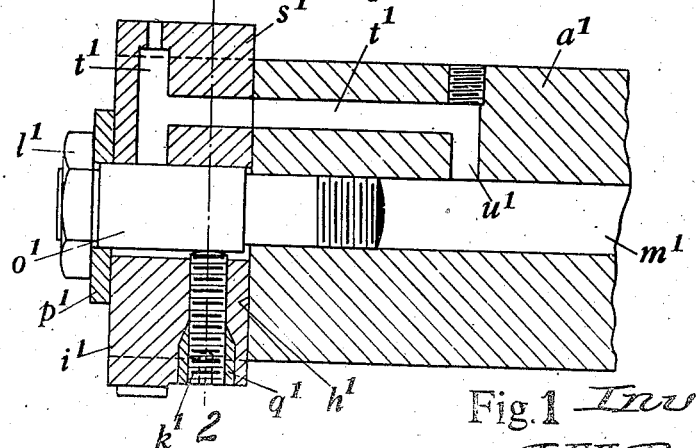

Figures 1 and 2 are respectively a fragmentary sectional side elevation and a sectional end elevation of a boring bar embodying the invention. Figure 1 being taken on the line 1—1 of Figure 2, and Figure 2 being taken on the line 2—2 of Figure 1.

Figure 3:
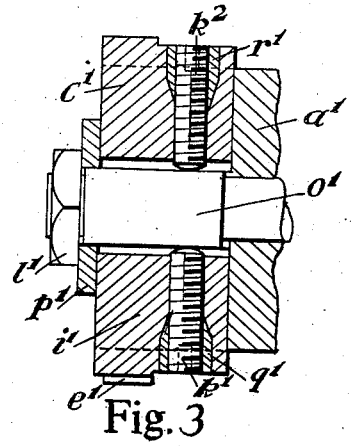

Figure 3 is a fragmentary sectional side view taken on the line 3—3 of Figure 2.

In carrying the invention into effect as shown, I form in the forward end of the boring bar $a^1$ a pair of transverse slots $b^1$, $h^1$ for accommodating the cutting tool $c^1$ and steadies $e^1$, $i^1$. The slot $b^1$ is inclined to the other slot $h^1$ as shown, so that the cutting edge of the tool can lie on or near a diametrical line passing through the axis of the bar $a^1$ at right angles to the last mentioned slot.

The bar $a^1$ is formed with an axial hole $m^1$ having secured in its forward end a stem $o^1$ which projects from the forward end of the bar, and which carries at its outer end a clamping collar $p^1$ for securing the cutting tool $c^1$ and steadies $e^1$, $i^1$ in position, the collar being secured on the stem by a nut $l^1$ in screw-threaded engagement with the outer end of the stem.

The steady $e^1$ is arranged in one end of the slot $b^1$, and the other steady $i^1$ is arranged in one end of the other slot $h^1$, both steadies projecting laterally to adjustable extents from the cylindrical surface of the bar $a^1$. The required adjustment of the steadies $e^1$, $i^1$ is effected by set screws $k^1$ inserted through them and abutting at their inner ends against the stem $o^1$. To secure the set screws $k^1$ against accidental movement lock nuts $q^1$ are mounted on the outer ends of the screws, and the holes formed in the steadies $e^1$, $i^1$ for receiving the screws are enlarged to accommodate these nuts, the latter having chamfered inner ends which co-operate with complementary surfaces of the steadies.

The cutting tool $c^1$ occupies the other end of the slot $b^1$, and is adjustable by a set screw $k^2$ in a similar manner to the steadies $e^1$, $i^1$, for determining the extent to which the cutting tool projects laterally from the bar $a^1$, accidental movement of this set screw being prevented by a lock nut $r^1$ similar to the previously described lock nuts $q^1$. The other end of the other slot $h^1$ may have inserted in it a third steady, but preferably it accommodates a dummy metal piece $s^1$ which is similar in shape to but is slightly shorter than the steadies $e^1$, $i^1$ so that its outer end does not abut against the surface of the bore in the work-piece.

To effect lubrication or cooling of the surface acted on by the cutting tool $c^1$ and steadies $e^1$, $i^1$, I may provide the metal piece $s^1$ or one of the steadies with a passage or passages $t^1$ which is or are connected by a passage $u^1$ in the bar $a^1$ to the axial hole $m^1$ in the bar, and which serves to conduct liquid lubricant or coolant from the said hole to the said surface.

When the cutting tool $c^1$ and steadies $e^1$, $i^1$ have been assembled in position their forward edges project slightly beyond the forward end of the bar $c^1$, and they are secured by the pressure exerted on them by the nut $l^1$ through the collar $p^1$, which latter is in contact with the said edges of the tool and steadies.

The steadies $e^1$, $i^1$ are made from, or tipped with very hard metal, such as tungsten carbide, and their outer ends are shaped as shown so that they abut against the surface of the bore in the work-piece at positions slightly behind the front edge of the cutting tool $c^1$ as the bar $a^1$ is being fed into the bore.

By this invention I not only afford the required lateral support to the bar in a very simple manner, during a cutting operation, and thereby obtain such a high degree of accuracy that subsequent reaming is unnecessary, but I also produce by means of the steadies a burnishing action which imparts a smooth and polished finish to the bore surface. Further by this invention the depth of the hole which can be bored is limited only by the length of the boring bar.

Having thus described my invention what I claim as new and desire to secure by Letters Patent is:

A boring bar adapted to carry at least one cutting tool, and having combined with it at least two laterally projecting steadies adapted to make contact with the surface of the bore at positions immediately behind the front edge of the cutting tool as the bar is being fed into the bore, one end of the bar being formed with a transverse opening for accommodating at opposite ends the cutting tool and one of the steadies, and with a second opening for accommodating the other steady, the first mentioned opening being inclined to the second opening so that the cutting edge of the tool can lie in the region of a diametrical line passing through the axis of the bar at right angles to the second opening.

JOHN MERVYN PERKINS.